April 12, 1949.　　　J. DOWIE ET AL　　　2,466,936
ORIENTING CONVEYER

Filed Jan. 25, 1947　　　3 Sheets-Sheet 1

INVENTORS
JAMES DOWIE
HAROLD H. HEINZELMAN
BY
ATTORNEY

April 12, 1949.  J. DOWIE ET AL  2,466,936
ORIENTING CONVEYER

Filed Jan. 25, 1947  3 Sheets-Sheet 2

INVENTORS
JAMES DOWIE
HAROLD H. HEINZELMAN
BY
John H. Lewis Jr.
ATTORNEY

April 12, 1949.　　　J. DOWIE ET AL　　　2,466,936
ORIENTING CONVEYER
Filed Jan. 25, 1947　　　　　　　　3 Sheets-Sheet 3
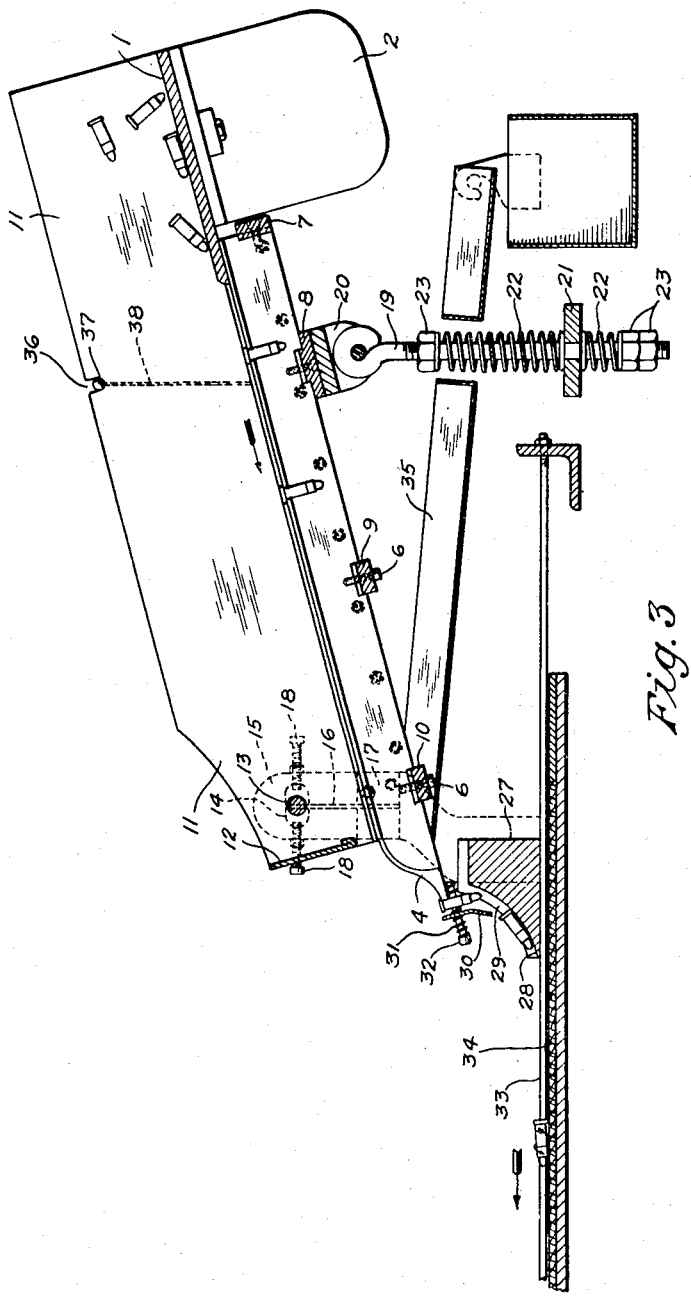
INVENTORS
JAMES DOWIE
HAROLD H. HEINZELMAN
BY
ATTORNEY Patented Apr. 12, 1949

2,466,936

UNITED STATES PATENT OFFICE 2,466,936

ORIENTING CONVEYER

James Dowie and Harold H. Heinzelman, Stratford, Conn., assignors to Remington Arms Company, Inc., Bridgeport, Conn., a corporation of Delaware Application January 25, 1947, Serial No. 724,298

3 Claims. (Cl. 198—33)

This invention relates to means for handling small articles and has particular reference to a conveyor which will systematically arrange articles such as loaded small arms cartridges and deliver them for a further operation.

It is a particular object of this invention to improve the feed means and assorting arrangement of such apparatus to a point where multiple, parallel rows of cartridges in the same orientation may be distributed upon an inspection belt. The inspection belt per se forms no part of this invention, a similar arrangement being shown, for example, in Patent No. 1,214,519.

It is contemplated that this object may be achieved by causing the articles which are delivered at high speed in a single row to spread themselves over a relatively wide area which discharges upon an orienting chute which, in turn, discharges through a direction changing chute upon the inspection table.

The exact nature of the invention as well as other objects and advantages thereof may be determined by study of the following specification referring to the accompanying drawings in which:

Fig. 3 is a partial cross-sectional view taken on the vertical plane including the line 3—3 in Fig. 1.

Fig. 4 is a partial cross-sectional view on the line 4—4 of Fig. 1.

Figure 1:
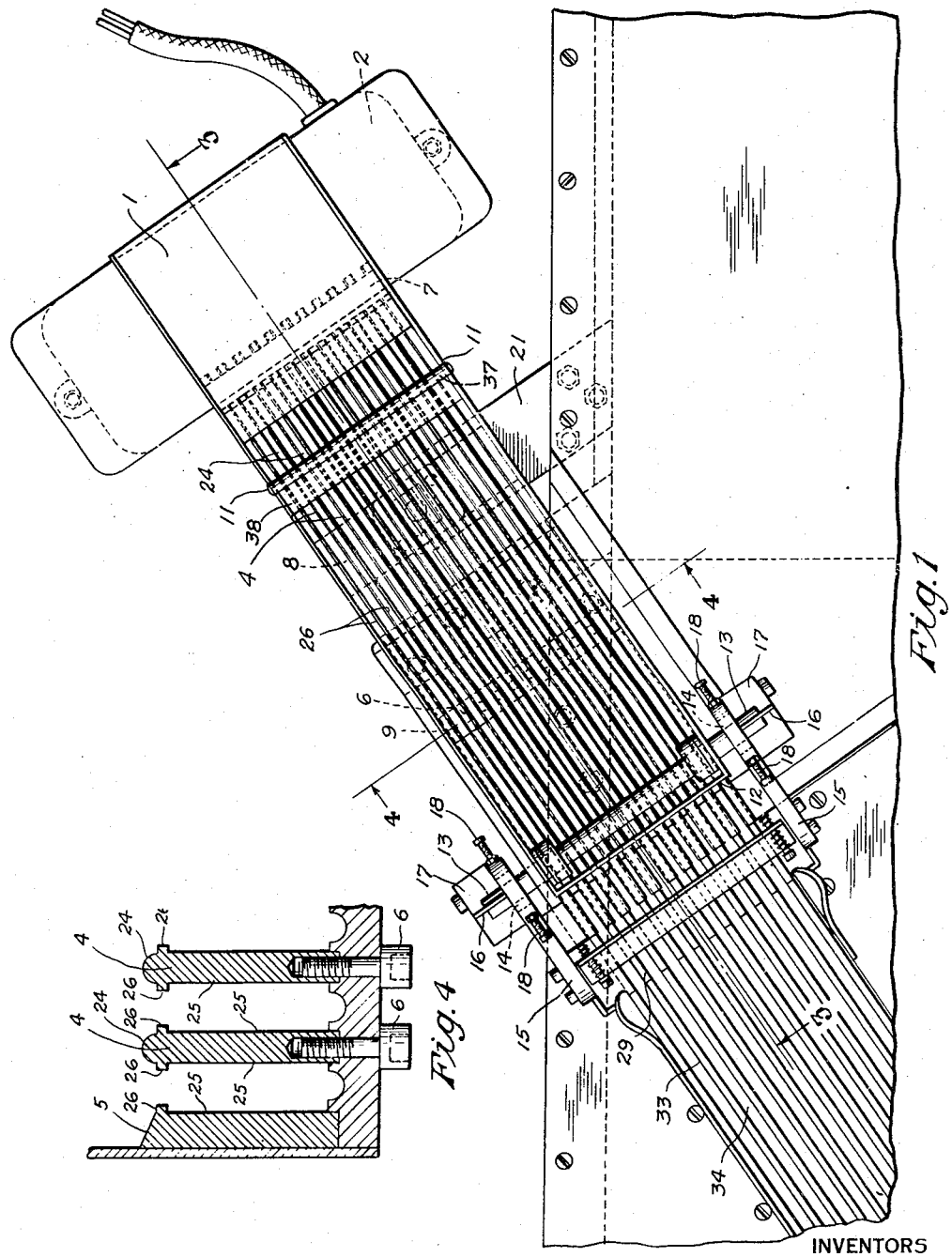
Fig. 1 is a top plan view of the feed mechanism with a part of the inspection table fed thereby shown in proper relation thereto.
Figure 2:
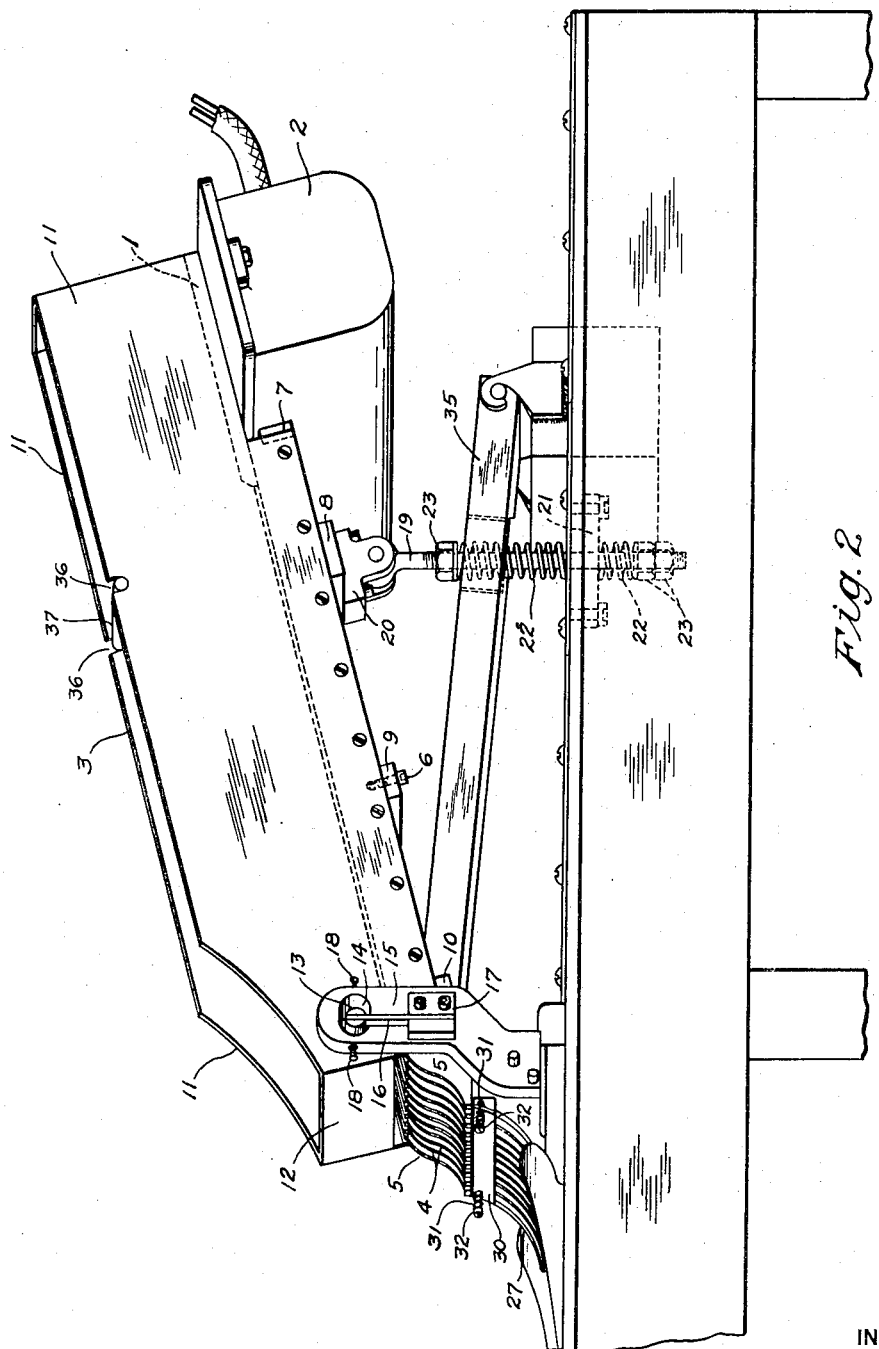
Fig. 2 is a side elevational view showing the same portion of the mechanism shown in Fig. 1.

Referring to the drawings by characters of reference, it may be seen that the invention comprises a receiving plate 1 upon which the cartridges may be deposited by any suitable means such as a delivery chute from a loading machine. The receiving plate 1 is preferably kept in a state of intense vibration by means of an electric vibrator 2 which has the effect of delivering a succession of sharply repeated blows in a direction normal to the plate 1. The cartridges passing over the receiving plate are, as a result of the vibration thereof, spread laterally and delivered with substantially lateral uniformity to the end of an orienting chute 3. The orienting chute comprises a series of rails 4 and a pair of outside rails 5 which may be secured in parallel relationship by any convenient means such as machine screws 6 threaded into crossbars 7, 8, 9 and 10. The rails 4 and 5 may also be threadably secured to the lower face of the receiving plate 1. To the outer rails 5 there may be secured the chute wall 11 which forms a side closure and a lower end closure 12. A cross-shaft 13 extends transversely through the side wall reaches of the chute 11 and is suitably journaled therein. Each end thereof is received in an elongated slot 14 in a bracket 15 which is suitably mounted on a base to be later described. Each end of the cross-shaft 13 is slotted to engage a single leaf spring 16, the lower end of which is similarly engaged in a block 17 mounted on the bracket 15. Set screws 18 are provided to limit the amount of swing of the shaft on its spring mounting. The chute assembly is adjustably maintained at a suitable incline by means of an eye bolt 19 pivotally secured to a pad 20 mounted on the crossbar 8. The eye bolt extends through a hole in a mounting bracket 21 and above and below the bracket coil springs 22 are confined on the shank of the eye bolt by nuts 23. It will be seen that the chute assembly is thus flexibly mounted by a three-point spring suspension at an adjustable inclination. The vibration of the receiving plate will extend to the whole feed chute and will assist in the orientation and feeding of the cartridges therethrough.

By reference to Fig. 4, in particular, it may be seen that each of the parallel rails 4 is provided with a rounded upper edge 24 and that the rails are undercut as at 25 to define a rail edge 26. The side rails 5 are each beveled on their upper edge and are similarly undercut to define rail edges 26 in opposition to those of the adjacent rails 4. The lateral spacing between the rail edges is slightly greater than that required to pass the body of a cartridge but somewhat less than that which would permit a cartridge rim to pass between the opposed rail edges 26. In consequence of this arrangement and the vibration of the entire assembly, the cartridges which are delivered from the plate 1 will be aligned longitudinally with the spaces between the rails, and by virtue of the greater weight of the bullets will drop through to hang suspended by their rims from the rail edges 26. The spreading action of the vibration of the plate 1 will result in an approximately equal distribution of cartridges between the various rails.

It may be noted that the delivery from an ammunition loading machine frequently contains small bits of lead scrap and less frequently other foreign material. The open structure presented by the orienting rails serves to completely screen out such extraneous material and a scrap chute 35 may be provided which intercepts such material and channels it to a suitable container for disposition.

At the lower end of the orienting chute the end of each rail is formed with a similar compound curvature which lowers the suspended cartridges sharply downward and then flattens out near the terminal end of the rail from which the cartridges are dropped in bullet down relationship. Positioned beneath the lower end of the orienting chute is a direction changing block 27 which provides a series of arcuate downwardly and outwardly curved tracks 28 separated by ribs 29 of similar curvature. The tracks 28 are aligned laterally with the spaces between the orienting rails, and the longitudinal positioning of the block 27 is such that a cartridge, falling bullet-down from the orienting rails, will contact the upper portion of the track 28 in approximately tangential relation. The outward curvature of the track will guide the cartridge as it falls under the influence of gravity and will deliver it bullet first and in axially horizontal position at the lower end of the track. To insure that the cartridges will be so delivered in spite of the possibility that their escape from the lower end of the track may be momentarily obstructed, there is provided a cartridge control plate 30 which is resiliently supported between springs 31 on mounting studs 32. The holes in the control plate are a loose fit on the mounting studs which allows the control plate freedom for swinging movement relative to the studs as well as giving it freedom for spring restrained sliding movement thereon. The curvature of the control plate and its positioning on the mounting studs is such that it normally lies in fairly close contact with the ribs 29 and thus serves to substantially close the upper portion of the track 28. At times the free escape of cartridges from the track 28 to the inspection table may be momentarily obstructed, resulting in a tendency for a cartridge to topple out of proper alignment in those portions of the tracks 28 where the cartridges are nearly vertically disposed. The relatively close fit of the control plate to the face of the tracks assists in preventing such toppling over. The control plate is also in position to deflect back into the track 28 any cartridge which tends to over-run the chute or any cartridge which, on falling from the end of the rails, has a tendency to deviate from bullet-down position. In the event of a jam in the tracks 28, the fact that the cartridges are only gravity fed will prevent an accident, while the resilient mounting of the control plate 30 will permit ready clearance of the jam. While applicants are not able to fully explain the theory behind the functioning of the compound curvature at the end of the rails and of the control plate 30, it is an observed fact that the acceleration experienced by the cartridges as they slide down the steeper part of the curve while the heads seem to pause slightly before dropping free combines with the effect of the control plate to deliver from the end of the chutes 28 an extremely high percentage of bullet-first cartridges.

The orienting and delivery chute may conveniently be mounted on the table of an inspection device of the type described in the patent above referred to. Briefly, the inspection device comprises a series of parallel guide rods 33 in prolongation of the ribs 29. Beneath these guide rods a conveyor belt 34 is driven at an angle which causes the cartridges to rotate continuously while a side component of the belt motion traverses them between the guide rods. Parallel, multiple rows of cartridges in continuous rotation are thus traversed continuously across the field of view of an inspector. Since defective cartridges are comparatively rare, they are readily perceptible when viewed in an environment of similarly positioned well-illuminated, perfect cartridges. The framework of the belt conveyor table may conveniently form the base on which the brackets 15 and the bracket 21 may be mounted.

Obviously, the use of our invention is not limited to the arrangement of cartridges for convenient inspection, since there are many other operations in industry which can be more conveniently effected by the use of orienting chutes constructed in accordance with our invention. Accordingly, it is our intention that the specific example illustrated herein be not considered as limiting the scope or usefulness of our invention and that it shall only be considered limited to the extent expressed in the claims appended hereto.

We claim:

1. A conveyor comprising laterally spaced parallel orienting rails sloping downwardly toward a discharge end, the spacing of said rails being such as to permit a rimmed article to hang therebetween suspended by its rim, an open direction changing chute having side walls and a bottom wall curving downwardly and outwardly from a point beneath the discharge end of said rails, and a flexibly mounted control plate constructed and arranged to form a baffle opposed to a continuation of the line of the upper edges of the discharge end of said rails and spaced from said discharge end by a distance slightly greater than the diameter of said rimmed articles, said control plate also extending downwardly to a position adjacent the edges of the side walls of said chute to form at least a partial cover for the open edge thereof, whereby said rimmed articles may slide down the rails in suspended relation, be dropped successively in generally tangential relation into the orienting chute, and be delivered thereby in columnar relation, rimmed ends trailing.

2. A conveyor comprising a vibrating feed plate; spaced parallel orienting rails joined to said feed plate and vibrated therewith; flexible mounting means supporting said feed plate and said rails in an angular position sloping from said feed plate to the end of said rails remote therefrom, said rails being so spaced as to receive a rimmed article from said feed plate and permit the article to slide therebetween suspended by its rim; a direction changing chute having side walls in alignment with said rails and having a bottom wall extending downwardly and outwardly in a curve approximately tangent to the position of a rimmed article hanging between said rails at the end thereof remote from the feed plate; and a flexibly mounted baffle plate supported outwardly from the said remote end of the rails and adjacent to the edges of the side walls of said chute in a position to form a partial cover for the tangential portion of the said chute, whereby said rimmed articles may be fed to said rails, oriented thereby and gravity fed to the direction changing chute successively in rim end uppermost relation, and delivered thereby in columnar relation, rimmed ends trailing.

3. A feed conveyor for rimmed cartridges comprising a vibrating feed plate; spaced parallel orienting rails having arcuate upper surfaces joined to the feed plate and vibrated therewith said rails being so spaced as to permit a cartridge to hang therebetween suspended by its rim; spaced side walls defining a trough bottomed by said feed plate and said rails; mounting means flexibly supporting said trough in an angular position sloping downwardly from said feed plate; a loosely hinged gate suspended from said side walls and overlying the arcuate upper surfaces of said rails to impede the flow of cartridges not yet rim suspended; a direction changing chute having walls in alignment with said rails and a bottom extending downwardly and outwardly in a curve approximately tangent to the position of a cartridge hanging suspended from the end of said rails remote from said feed plate; and a baffle plate flexibly supported to form a partial cover for the tangential portion of said chute, whereby cartridges may be fed to said rails, oriented thereby, gravity fed in succession to the direction changing chute in rim end uppermost position, and delivered thereby in columnar relation, rimmed ends trailing.

JAMES DOWIE.
HAROLD H. HEINZELMAN.

REFERENCES CITED

The following references are of record in the file of this patent:

UNITED STATES PATENTS

| Number | Name | Date |
|---|---|---|
| 1,257,946 | Peterson | Feb. 26, 1918 |
| 1,311,590 | Bingham | July 29, 1919 |
| 2,359,861 | Koehler | Oct. 10, 1944 |